United States Patent [19]

D'Orlando

[11] Patent Number: 4,808,104

[45] Date of Patent: Feb. 28, 1989

[54] DOUGH FORMING AND CUTTING DEVICE

[76] Inventor: Michael D'Orlando, 8701 Shore Rd., Brooklyn, N.Y. 11209

[21] Appl. No.: 117,577

[22] Filed: Nov. 6, 1987

[51] Int. Cl.$^4$ ............................................. A21C 11/00
[52] U.S. Cl. .................................... 425/298; 99/432; 425/193; 425/374; 426/512; 426/503
[58] Field of Search ....................... 426/503, 512, 518; 425/194, 292, 298, 374, 193; 30/278, 346, 358; 99/432, DIG. 15; D7/43, 99

[56] References Cited

U.S. PATENT DOCUMENTS

| | | | |
|---|---|---|---|
| 2,868,145 | 1/1959 | Brooke | 426/503 |
| 3,166,027 | 1/1965 | Sprenzel | 425/193 |
| 3,671,008 | 6/1972 | Villalba | 425/172 |
| 4,009,857 | 3/1977 | Delmas | 425/374 |
| 4,522,580 | 6/1985 | Poister | 425/374 |

Primary Examiner—George Yeung
Attorney, Agent, or Firm—John P. Sinnott

[57] ABSTRACT

An illustrative embodiment of the invention comprises an annular device for preparing pie crusts in which the inner margin of the device defines the central, circular opening. The margin, perpendicular to the base of the device, also forms a cutting edge that slopes away from the opening and toward the base until it intersects a flat working surface for the device. An arcuate surface, curving from the working surface to the base enables the device to be positioned on a breadboard with the cutting edge oriented in the proper direction. By rolling dough deposited in the opening, the opening fills up to the margin and surplus dough flows over the cutting edge and onto the working surface, the cutting edge severing the surplus dough from the shaped mass in the opening. The device, with surplus dough, is lifted smartly away from the breadboard, leaving a circular pie crust of uniform thickness defined by the marginal distance between the base and the crest of the cutting edge.

2 Claims, 1 Drawing Sheet

DOUGH FORMING AND CUTTING DEVICE

TECHNICAL FIELD

This invention relates to apparatus and method for forming dough and, more particularly, to apparatus and method for forming dough into a crust of predetermined thickness and shape, and the like.

BACKGROUND ART

Devices that cut and shape dough were created side-by-side with the development of the pastry art. Almost every culture or civilization has devised some means for shaping baked products for any number of reasons. Illustratively, cookie cutters have been used for generations not only to delight children and adults with baked products that have attractive and fanciful shapes, but also to provide an inexpensive means for swiftly and conveniently making a large number of the same product to satisfy a mass market. There are other purposes that have been served by dough forming devices. These purposes occupy a spectrum that extend from satisfying a simple, utilitarian need for "our daily bread" to ecclesiastical purposes, of which "hot cross buns" and the other baked goods that are used to celebrate religious holidays and ceremonies are typical.

The following patents are typical of dough forming apparatus that satisfy these needs to a greater or lesser extent:

U.S. Pat. No. 2,026,829 granted Jan. 7, 1936 to F. Ellinger for "Pie Pan" shows a pie tin and an associated annular cutting ring for preparing a pie crust.

U.S. Pat. No. 2,546,656 granted March 27, 1951 to S. S. Smith for "Device For Making Pie Crusts" shows a pie crust mold and an associated ring for making a pie.

U.S. Pat. No. 3,166,027, granted Jan. 19, 1965 to A. Sprenzel for "Dough Forming And Sizing Device" shows a form and shims for making pie crusts of predetermined thickness.

U.S. Pat. No. 3,322,074, granted May 30, 1967 to M. A. Malnory for "Dough Mold" shows a pie crust mold that includes a cutting edge for forming the bottom pie crust and an annular insert with an associated cutting edge for forming the top pie crust.

U.S. Pat. No. 3,671,008 granted June 20, 1972 to F. A. Villalba, Jr. for "Food Mold" shows a frame that houses a flat circular disk to vary the thickness of the dough being shaped within the mold cavity.

U.S. Pat. No. Des. 245,827 granted September 20, 1977 to R. F. Korpi for "Hamburg Patty Press" shows a compression mold for shaping food products.

U.S. Patent No. Des. 255,412 granted June 17, 1980 to N. Bereza for "Pie Crust Maker, Or Similar Article" shows a compression mold for making, apparently, bottom pie crusts.

U.S. Pat. No. 4,431,395 granted Feb. 14, 1984 to G. B. Babos for "Gingerbread House Apparatus" shows a set of baking tins for making gingerbread house components.

DISCLOSURE OF THE INVENTION

None of the foregoing patents satisfy the need for a relatively inexpensive device for forming and cutting dough, a device, moreover, that is simple to manufacture, to use and to clean after such use.

In accordance with the principles of the invention, a device is provided that has an inner opening, the margin of which defines the desired outline for the final, baked product. The inner opening margin, moreover, is a sharply defined surface that is perpendicular to the base of the device. The margin terminates in a cutting edge that slopes away from the margin at a slight angle toward the base until the cutting edge intersects the flat working surface of the device, which surface is generally parallel with the base. The outer perimeter of the device terminates in a rounded edge which curves toward the base.

In operation, the base of the device is mounted on a breadboard, or other suitable surface, and a portion of dough is placed approximately in the center of the inner opening. The dough is rolled, by means of a rolling pin, until it completely fills the opening up to the device's inner margins. Surplus dough is expressed over the cutting edge through the rolling action, the excess flowing over the cutting edge and onto the flat working surface. As the rolling pin bears against the cutting edge at the opening margin, it cuts the surplus dough away from the mass within the opening. Upon filling the entire opening, the rolling and pressing is stopped and the device is lifted away from the breadboard. Left behind on the breadboard is an unbaked crust of dough, pressed into the desired shape and enjoying a thickness that is equal to the depth of the margin, as measured from the crest of the cutting edge to the base of the device.

Thus, there is provided a simple, effective and inexpensive method and apparatus for forming crusts into predetermined shapes and thicknesses. The device can be cleaned thoroughly after each use and, because of the device's curved outer perimeter, is readily mounted on the breadboard in a manner that always orients the cutting edge in the proper direction. These, and other features of the invention are readily ascertainable from the following detailed description of a specific embodiment of the invention. The scope of the invention, however, is limited only through the claims appended hereto.

MODE FOR CARRYING OUT THE INVENTION

Figure 1:
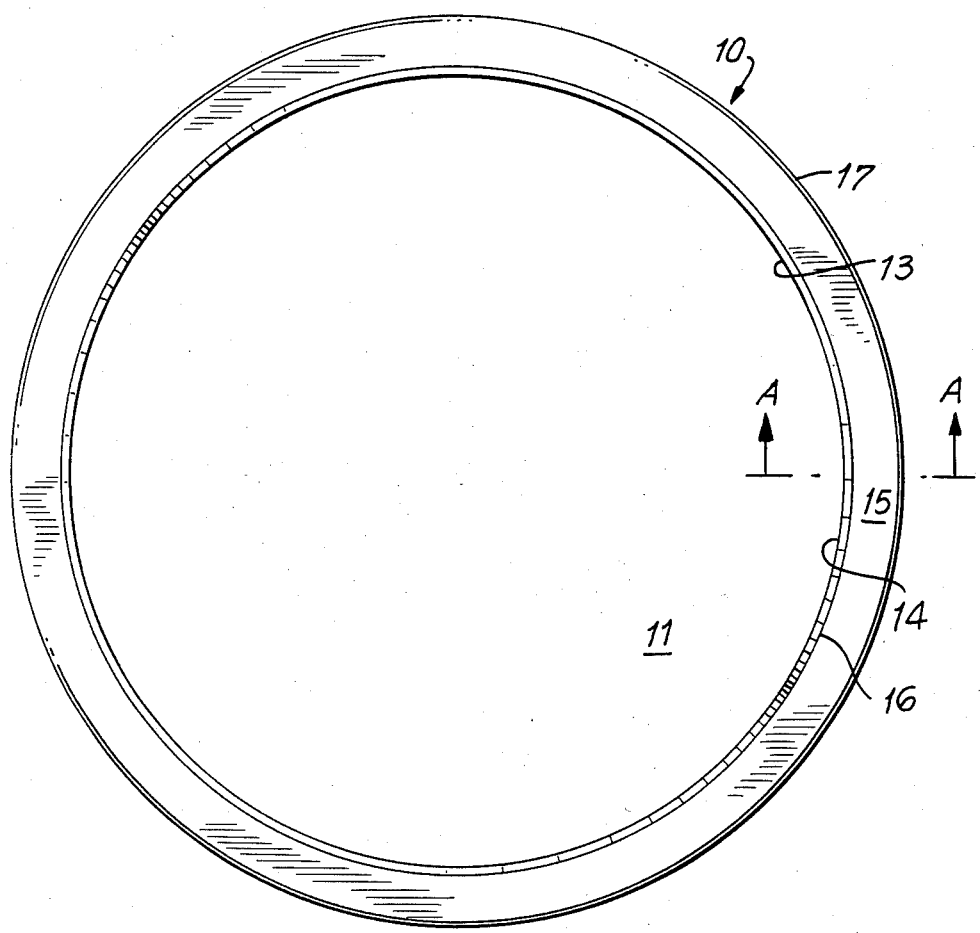
FIG. 1 is a plan view of the particular embodiment of the invention.

For a more detailed appreciation of the invention, attention is invited to FIG. 1, which shows an annular device 10 for making circular pie crusts (not shown) in accordance with the principles of the invention. As illustrated, the device 10 is annular for producing a circular crust or baked good. Certainly, other shapes are within the scope of the invention, and the device 10 is shown in FIG. 1 as an annulus only for the purpose of simplified description.

Preferably, the device 10 is formed from a suitably hard, but flexible (F.D.A. Grade Acrylic Butyl Styrene), Lexan, Plexiglass or the like. The device 10 has a circular opening 11, the diameter of which is equal to the diameter of the crust that is to be produced.

Figure 2:
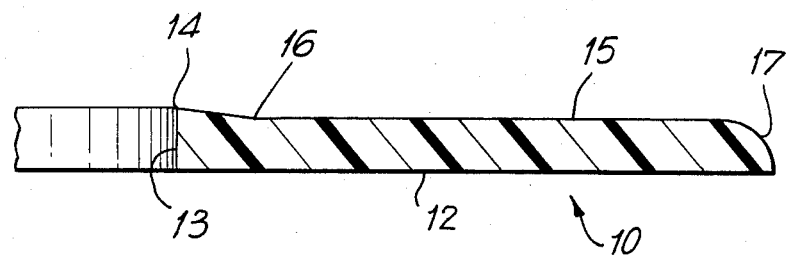
FIG. 2 is an enlarged side elevation in full section of the embodiment of the invention shown in FIG. 1, taken long the line A—A of FIG. 1 and viewed in the direction of the arrows.

As best shown in FIG. 2, the device 10 has a generally flat base 12, and a margin 13 that is perpendicular to the base 12. As shown, the margin 13 defines the diameter of the opening 11 (FIG. 1). The margin 13 terminates in a cutting edge 14 that protrudes above a generally flat working surface 15. The working surface 15 is parallel with and spaced from the base 12.

In accordance with a feature of the invention, the cutting edge 14 slopes away from its crest at the margin 13 toward the base 12 of the device 10 until the cutting edge 14 intersects the flat working surface 15 to form a crease 16. The slope that characterizes the cutting edge 14 must establish not only the sharpness that is needed to effectively cut surplus dough from the mass within the opening 11, but also to be sufficiently blunt to prevent injury to those who use the device 10. A feature of the invention, in this respect, is the 5½° slope formed between the cutting edge 14 and the working surface 15. The 5½° angle strikes the correct balance between the required dough-cutting sharpness and the bluntness required to protect the user from injury.

Consequently, the margin 13 defines the shape of the opening 11 and the thickness of the crust, the thickness being the length of the margin 13 between the base 12 and the crest of the cutting edge 14.

An additional feature of the invention is provided by an arcuate surface 17 which establishes the outer perimeter of the device. The illustration of the invention in FIG. 2 depicts the arcuate surface 17 curving from the working surface 15 to the base 12. Consequently, when placing the device 10 on a breadboard or the like (not shown in the drawing), to prepare the device for use, the orientation of the arcuate surface 17 enables the user to place the device in a position in which the cutting edge 14 is exposed to perform its function as described subsequently, in more complete detail. Thus, the orientation of the arcuate surface 17 prevents the user from placing the device 10 on the breadboard with the cutting edge 14 bearing uselessly against the surface of the breadboard.

In operation, and as shown in FIG. 1, the device 10 is placed on a breadboard with the arcuate surface 17 curving toward the board and the cutting edge 14 exposed. A lump of pliable dough (not illustrated) is placed approximately in the center of the opening 11.

The dough then is rolled, by means of a rolling pin (not shown) or other suitable apparatus, until the dough presses against the margin 13 and completely fills the opening 11. Surplus dough (also not shown) flows over the crest of the cutting edge 14 at the margin 13. This surplus dough, under the force of the rolling pin, flows toward the crease 16 and across the working surface.

By pressing the rolling pin against the dough and the device 10, the cutting edge 14 protrudes through the dough, thereby severing the dough within the opening 11 from the surplus dough that flowed over the cutting edge and across the working surface 15.

The device 10 is then smartly lifted from the breadboard. Carried with the lifted device 10 is the surplus dough, which can be used again. The pie crust, however, remains behind on the breadboard, rolled to its desired shape and thickness as determined by the margin 13.

INDUSTRIAL APPLICABILITY

This invention is useful in the preparation of foodstuffs and, more particularly for the preparation of crusts for baked goods.

I claim:

1. A device for shaping foodstuffs comprising a margin for establishing an opening within the device to receive the foodstuffs and to establish the shape of the foodstuffs, a base for the device extending from said margin in a direction away from said opening, a working surface spaced from said base and generally parallel therewith, an arcuate surface extending from said working surface toward said base to establish the outer perimeter for the device, and a cutting edge protruding from said working surface and sloping from said margin toward said base to an intersection with said working surface, said cutting edge forming an angle of about 5½° with said working surface.

2. A device according to claim 1 wherein said margin establishes a circular opening.

* * * * *